INVENTOR.
ITALO A. CAPUANO

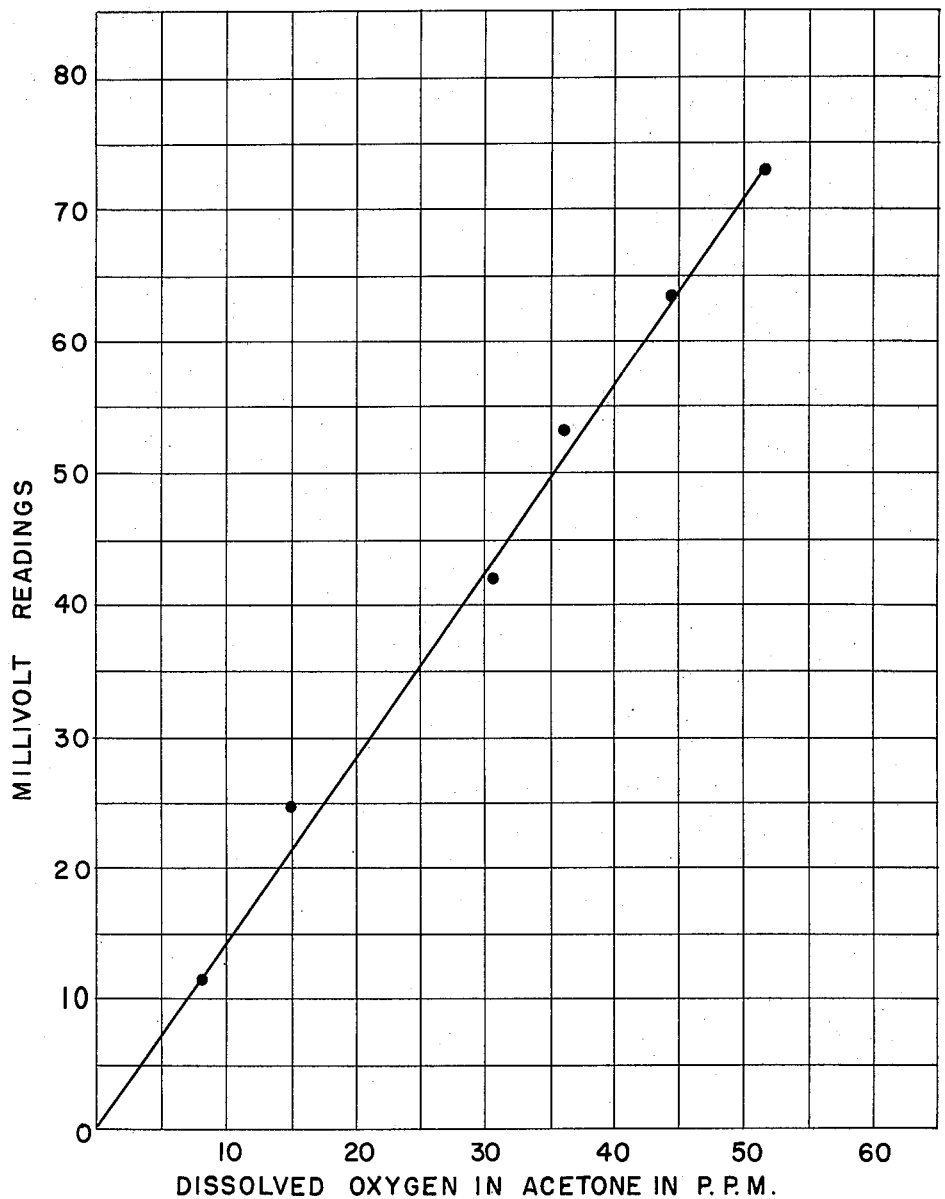

3,218,242
MEASUREMENT OF THE CONCENTRATION OF DISSOLVED OXYGEN IN LIQUIDS
Italo A. Capuano, St. Albans, W. Va., assignor to Union Carbide Corporation, a corporation of New York
Filed Jan. 4, 1962, Ser. No. 164,311
5 Claims. (Cl. 204—1)

This invention relates to a method and apparatus for measuring the concentration of dissolved oxygen in liquids, particularly in water-containing liquids.

The need for a reliable and accurate method for determining the concentration of oxygen dissolved in liquids has become apparent in various areas. For example, the dissolved oxygen concentration of rivers into which are discharged waste product and disposal streams must be held above certain levels to support aquatic life. A major difficulty in controlling such disposal streams has been the lack of a method for continuous measurement of oxygen dissolved in such streams. Further, the development of modern high-pressure boilers has focused attention on the problem of dissolved oxygen in the boiler water leading to corrosion of equipment. As a preventive measure for minimizing corrosion, the oxygen content of the boiler feed water must be kept below certain levels, again requiring suitable oxygen monitoring devices. In addition, the degree of contamination of organic liquids used as extraction solvents in industrial processes is often determined by their dissolved oxygen content. For example, when acetone is used as a scrubbing medium for the removal of acetylene from ethylene, steps are taken to purify the acetone solvent before the oxygen dissolved in said solvent leads to contamination of the ethylene. In addition to the importance of a satisfactory method for oxygen measurement in industrial processes, the frequent need for determining biological oxygen demand and the determination of oxygen content of various organic liquids as well as water in the laboratory calls for a rapid, stable, and accurate oxygen measuring device.

Although numerous proposals have been made relative to methods and apparatus to achieve effective oxygen measurements, the diffculties inherent in such measurement, scil. extremely low oxygen concentrations in the parts per million range, interferring constituents, the necessity for continuous and rapid response of the measuring device, have not been solved to complete satisfaction by any of the known devices. For example, known chemical oxidation reactions, such as the exidation of suspended manganese hydroxide, have been employed with some success. However, such chemical methods involve the consumption of chemicals and do not lend themselves to continuous analysis. Also, various oxygen measuring devices utilizing the conductivity principle have been used. While certain of these devices have proven useful, their efficacy is limited by certain inherent disadvantages. Conductometric measurements are very sensitive to temperature changes and thus require accurate temperature control. Thus, in a sewage plant, for example, where it is necessary to know the dissolved oxygen concentration in the aeration reactor at whatever temperature the water may be, the use of a dissolved oxygen analyzer operating at a fixed temperature does not furnish the proper determination, unless an involved sampling system leading to a certain response time delay is used. Also, conductivity measurements are affected by interfering constituents in the liquid to be measured and thus the use of such techniques requires cumbersome and expensive means for removing the interfering constituents from the sample.

It has now been found that the concentration of dissolved oxygen in water and organic liquids can be measured rapidly, accurately, and continuously by the method and apparatus of the present invention. The method of this invention is further advantageous in that it is highly specific for measuring oxygen, thus obviating interfering effects from other constituents of the liquid to be analyzed, and, still further, in that the effect of temperature variations of the sample to be analyzed on measurements according to this invention is negligible.

Basically, the method of the present invention comprises immersing in the liquid to be analyzed an electrode pair consisting of a first electrode composed of metallic thallium and a second reference electrode, and measuring the voltage produced by said electrode pair as a measurement of the concentration of oxygen dissolved in the liquid.

While no particular theory underlying the success of this invention is relied upon, the chemical reactions that give rise to the voltage to be measured are believed to be as follows. (For purposes of illustration, the reference electrode is assumed to be a calomel electrode.)

(1)  $2Tl° + \frac{1}{2}O_2 + H_2O \rightarrow 2Tl^+ + 2OH^-$
(2)  $2Tl^+ + 2e^- \rightarrow 2Tl°$
(3)  $2Hg° + 2Cl^- \rightarrow Hg_2Cl_2 + 2e^-$ Initially, the oxygen dissolved in the liquid to be analyzed reacts, in the presence of water, with thallium to form two equivalents of thallous hydroxide per one-half mole of oxygen, as shown in Equation 1 above. The thus formed thallous ions are then reduced at the thallium electrode, taking one electron per ion from said electrode as shown by Equation 2 above. The reference electrode, assumed here to be a calomel electrode, supplies electrons to the thallium electrode through an external connection by the oxidation of mercury to mercurous chloride as shown in Equation 3 above. The voltage produced by the electrode pair is measured by voltmeter means in said external connection and is directly proportional to the concentration of dissolved oxygen in the liquid.

It can be seen that the thallium metal used up as shown in Equation 1 above, by the formation of thallous ions, is replated onto the thallium electrode as shown in Equation 2, by the reduction of said thallous ion. The thallium electrode is, therefore, self-regenerative although in a dynamic system some of the thallous ions produced by Equation 1 may be carried away by the flowing liquid. Such loss of thallous ions, while necessitating replacement of the thallium electrode after long periods of operation, has been found not to impair the sensitivity of the electrode even after extended periods of continuous use, e.g., one month or more.

A salient feature of the method of this invention resides in the fact that other constituents of the liquid to be analyzed, such as $H_2S$, $I_2$, $Br_2$, $Cl_2$, form insoluble compounds with thallium and thus do not produce thallous ions which could distort the voltage produced by dissolved oxygen alone, but instead form insoluble inert salts. In analyzing water containing such constituents by the method of this invention, it was found that they neither interfere with accurate oxygen determination nor poison the thallium electrode.

It should be understood that a certain initial voltage is produced in an oxygen-free water&thallium system due to the action of water on metallic thallium to produce some thallous ions. However, this initial electropotential remains constant with varying dissolved oxygen concentrations. Thus, once the initial voltage has been determined for a given system, any deviation from the initial voltage will be an accurate measure, and directly proportional to, the dissolved oxygen concentration. The pH of the sample to be analyzed affects the voltage readings to some extent so that calibration of the apparatus should be carried out at the same pH as that of the liquid samples to be analyzed.

A better understanding of the present invention may be had by reference to specific embodiments thereof and the drawings hereto in which:

FIGURES 3 and 4 are graphs showing the correlation between dissolved oxygen concentration and voltage produced by the apparatus of FIGURES 1 and 2, respectively.

Figure 1:
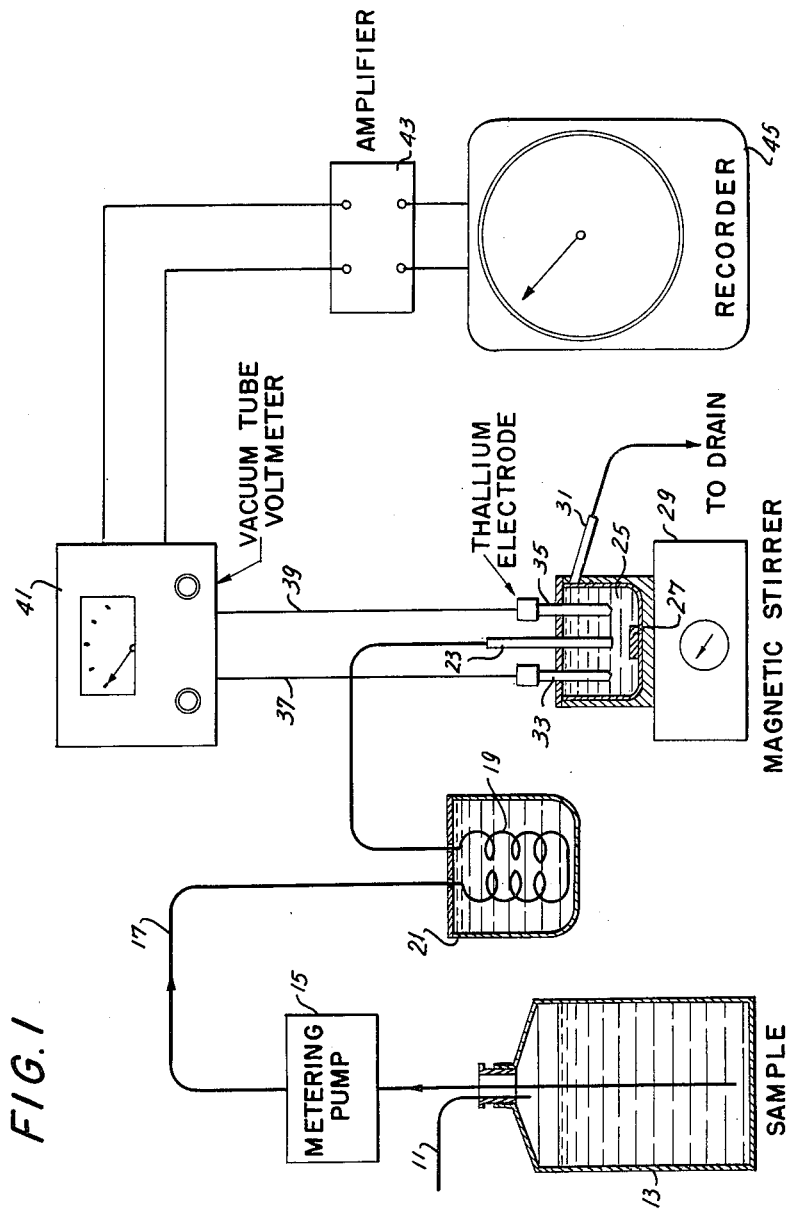
FIGURE 1 is a schematic representation of an apparatus used for continuous determination of dissolved oxygen in water.

FIGURE 1, a typical scheme for continuously analyzing water according to this invention is shown. Water to be analyzed is lead via conduit 11 into a sampling chamber 13 and thence to a metering pump 15 where the flow rate is recorded. After passing through metering pump 15, the water stream is lead via conduit 17 through a coil immersed in constant temperature bath 21. The coil 1 is so designed as to allow the water to attain a constant temperature substantially equal to that of bath 21. The water stream is then introduced through inlet tube 23 into cell chamber 25 wherein are positioned in spaced relationship two electrodes, a first measuring electrode 35 composed of metallic thallium and a second reference electrode 33, such as a calomel electrode or a silver-silver chloride electrode. Cell chamber 25 is equipped with stirrer means to insure homogeneous mixing, such as magnetic stirrer means comprising a magnet 27 within the cell chamber 25 and immersed in the liquid to be analyzed and magnet actuating means 29 without cell chamber 25. The water stream, after having been brought into thorough contact with the electrode pair, drains from cell chamber 25 through outlet 31. The electromotive force developed by said electrode pair is directed to high impedance voltmeter means 41 connected to reference electrode 33 by lead 37 and to thallium electrode 35 by lead 39. If desired, recording means 45 and amplifying means 43 can be connected in parallel with said voltmeter means 41 to effect continuous recordation of the voltage produced by the electrode pair.

Figure 3:
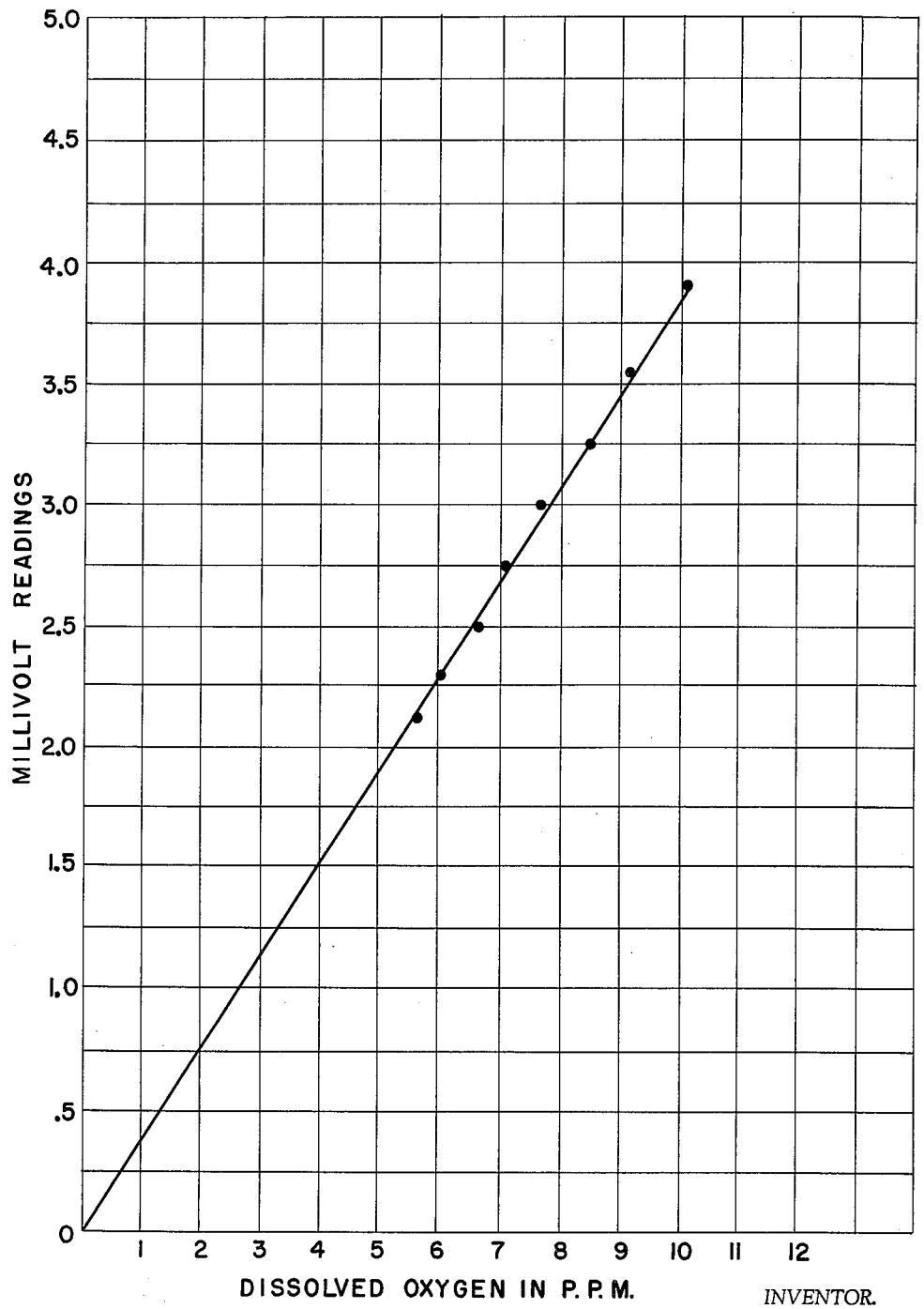

As an example of the practice of this invention, several samples of water, at 20° C., containing dissolved oxygen were analyzed for oxygen concentration, first by the standard Winkler method, as described in "Standard Methods for Examination of Water, Sewage, and Industrial Waste," 10th Edition, Am. Pub. Health Assoc., New York, 1955, and then by the method of this invention. The apparatus employed was arranged as shown in FIGURE 1 and comprised a temperature controlled water bath to maintain a constant sample temperature of 20° C., a cell chamber in which were positioned a thallium electrode and a calomel electrode, a vacuum tube voltmeter connected to said electrodes, and a 5 millivolt circular chart recorder connected to said voltmeter. FIGURE 3 shows the instrument calibration for 0 to 10 parts per million of dissolved oxygen. The zero point of the curve was obtained with a sample of water which had been well scrubbed with nitrogen.

To determine the reproducibility of measurements using the above apparatus, five comparative determinations were made of certain oxygen-containing water samples. The results are given in Table I below.

*Table I*

| Number of the determination | Dissolved oxygen in p.p.m. by weight | | |
|---|---|---|---|
| | Added | Found | Difference |
| 1 | 8.7 | 8.8 | +0.1 |
| 2 | 8.8 | 9.0 | +0.2 |
| 3 | 8.8 | 8.8 | 0.0 |
| 4 | 8.7 | 8.6 | −0.1 |
| 5 | 8.8 | 8.5 | −0.3 |
| Average deviation | | | ±0.14 |

In order to determine the relationship between the cell E.M.F readings and pH variations, several samples of water of different pH readings were analyzed according to this invention. The results of these tests are shown in Table II below.

*Table II*

| Millivolt readings: | pH readings |
|---|---|
| 4.35 | 5.20 |
| 4.25 | 5.90 |
| 4.15 | 7.25 |
| 4.10 | 7.90 |
| 4.07 | 8.30 |
| 4.02 | 9.50 |

Figure 2:
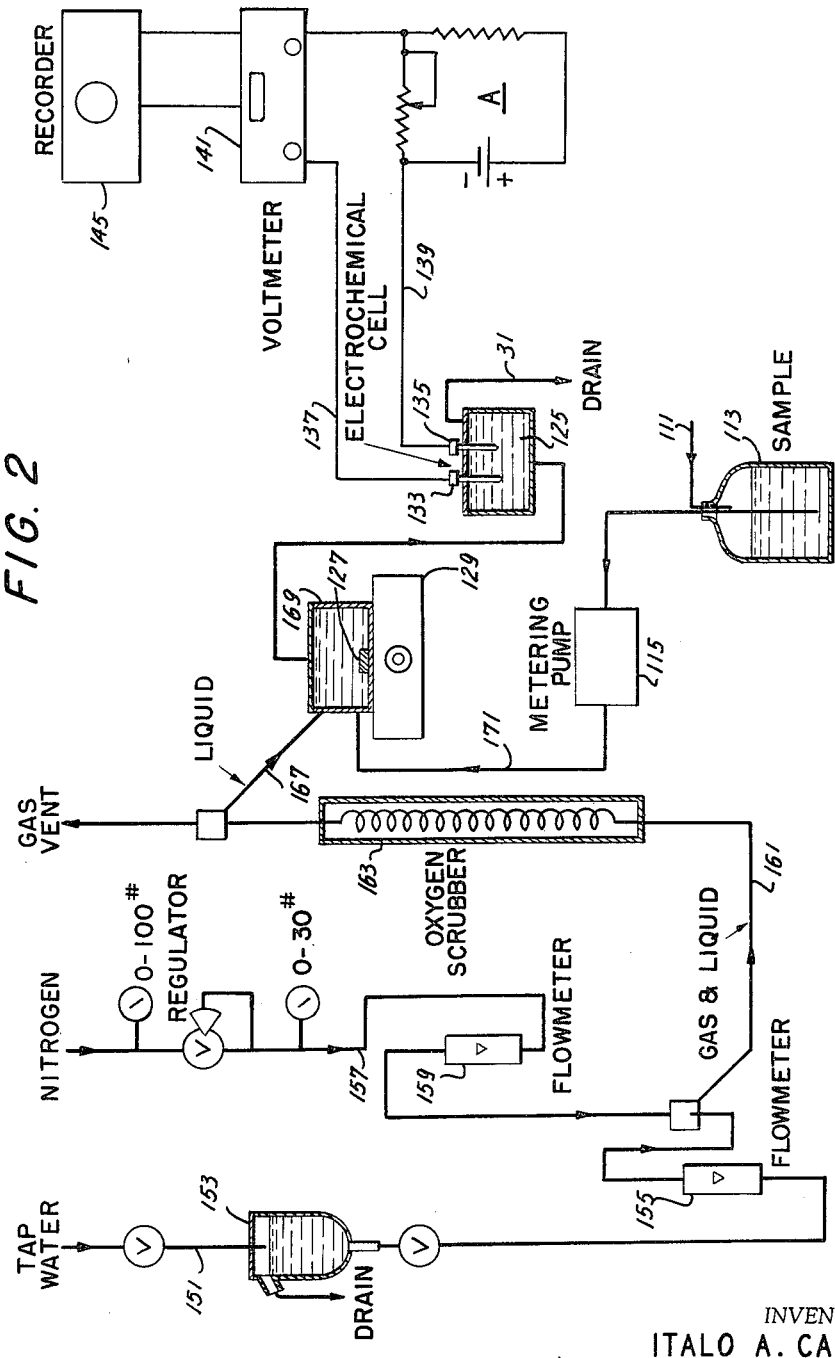
FIGURE 2 is a schematic representation of an apparatus used for continuous determination of dissolved oxygen in non-aqueous liquids.

By minor modifications, the method of this invention may be adapted for the measurement of oxygen dissolved in organic liquids. Such measurement requires that a small quantity of oxygen-free water, to supply at least two moles of water for every mole of dissolved oxygen, be added to the organic liquid before measurement. In FIGURE 2, an embodiment of this invention adapted for organic liquids is shown. Tap water is lead through conduit 151 to a constant liquid head chamber 153 and through flow meter 155 and then mixed with a nitrogen stream 157 metered by flowmeter 159 to form a gas-liquid stream 161 and scrubbed with said nitrogen stream in oxygen scrubber 163 to remove all traces of dissolved oxygen from said water. The resulting oxygen-free water is then introduced through conduit 167 into mixing chamber 169 into which is simultaneously introduced an organic liquid sample stream 171 containing dissolved oxygen, said liquid sample stream 171 having been led from supply line 111 through sample chamber 113 and metering means 115. The organic sample stream 171 and the oxygen-free water stream are intimately mixed by magnet 127 actuated by stirrer means 129 and the resulting homogeneous mixture led to cell chamber 125. In cell chamber 125 are positioned a first measuring electrode 133 composed of metallic thallium and a second reference electrode 135, which electrodes are externally connected through voltmeter means 141 by leads 137 and 139, respectively. In the particular embodiment shown, a bucking circuit, designated generally by reference letter A, has been incorporated in the external connection shown to cancel out an initial electropotential force of −800 millivolts produced by an oxygen-free water/organic solvent system. Recorder means 145 connected to the voltmeter means 141 may be used for continuous recordation of the voltage produced.

As an example of the practice of this invention as applied to organic liquids several samples of acetone containing dissolved oxygen in various concentrations were analyzed first by a standard polarographic method, as described by Tyler et al, in "Portable Analyzer for Determination of Dissolved Oxygen in Water," Analytical Chemisty—volume 31, No. 4, April, 1959, pp. 499–502, and then by the method of this invention. The apparatus employed was arranged as shown in FIGURE 2. Tap water at a constant flow rate of 55 milliliters per minute was continuously introduced into a scrubber where it was deoxygenated by a stream of pure nitrogen flowing at a rate of 200 milliliters per minute. The resulting oxygen-free water was then separated from the nitrogen gas and introduced into a mixing chamber equipped with a magnetic stirrer, and mixed with an acetone sample stream introduced into said mixing chamber at a flow rate of 70 milliliters per minute. The resulting water/acetone liquid mixture was passed through a cell chamber in which were positioned a thallium electrode and a calomel electrode, and then discharged through a drain. Connected to the electrodes of the cell chamber was an electrical bucking network to annul an original e.m.f. of −800 millivolts created by a water/acetone system containing no oxygen. The bucking circuit consisted of a video power supply set to give its minimum 4 volts output, a 1000 ohm 10 turn helipot, and a 1000 ohm fixed resistor arranged as shown in FIGURE 2. The electropotential developed by the dissolved oxygen in the liquid sample was fed into a D.C. vacuum tube voltmeter and permanently recorded on a 10 millivolt circular chart recording potentiometer, after the voltmeter signal was attenuated by connecting a 1000 ohm 10 turn helipot in the recorder. The voltage readings corresponding to various dissolved oxygen concentrations are shown in the graph of FIGURE 4 wherein the voltage readings are as taken from the vacuum tube voltmeter.

It will be readily apparent to those skilled in the art that the method of this invention can easily be extended to the analysis of other organic liquids, it being understood that a small quantity of water must be added to such organic liquid in order to render the method of this invention effective. As typical of the organic liquids which can be analyzed by this invention for dissolved oxygen concentration, there can be mentioned, in addition to acetone, various alcohols, glycols, and ketones, such as methyl alcohol, ethyl alcohol, propyl alcohol, isopropyl alcohol, ethylene glycol, propylene glycol, polyethylene glycol, polypropylene glycol, methyl ethyl ketone, and glycerol. The only requirements demanded of the organic liquid in order to be successfully analyzed are that it be miscible with water and inert to thallium metal.

What is claimed is:

1. A method for measuring the concentration of oxygen dissolved in a liquid containing water and dissolved oxygen which comprises immersing in said water-containing liquid an electrode pair consisting of a first electrode composed of metallic thallium and a second, reference, electrode, and measuring the voltage produced by said electrode pair as a measurement of the dissolved oxygen concentration, said liquid being devoid of thallium ions except those originating from the thallium electrode.

2. A method for measuring the concentration of oxygen dissolved in water containing dissolved oxygen which comprises immersing in said water an electrode pair consisting of a first electrode composed of metallic thallium and a second, reference, electrode, and measuring the voltage produced by said electrode pair as a measurement of the dissolved oxygen concentration, said water being devoid of thallium ions except those originating from the thallium electrode.

3. A method for measuring the concentration of oxygen dissolved in non-aqueous liquids containing dissolved oxygen, said liquid being miscible with water and inert to thallium metal which comprises adding to said non-aqueous liquid a quantity of water sufficient to provide at least two moles equivalents of water per mole equivalent of oxygen dissolved in said non-aqueous liquid, immersing in the resulting non-aqueous liquid/water mixture an electrode pair consisting of a first electrode composed of metallic thallium and a second reference electrode, and measuring the voltage produced by said electrode pair as a measure of the concentration of dissolved oxygen in said non-aqueous liquid, said non-aqueous liquid/water mixture being devoid of thallium ions except those originating from the thallium electrode.

4. A method for continuously measuring the concentration of oxygen dissolved in a water-containing liquid stream containing dissolved oxygen which comprises passing said liquid stream through a cell chamber wherein is positioned an electrode pair consisting of a first electrode composed of metallic thallium and a second, reference, electrode, and measuring the voltage produced by said electrode pair as a measurement of the dissolved oxygen concentration, said liquid stream being devoid of thallium ions except those originating from the thallium electrode.

5. A method for measuring the concentration of oxygen dissolved in a water-containing liquid containing dissolved oxygen which comprises immersing in said water-containing liquid an electrode pair consisting of a first electrode composed of metallic thallium and a second, calomel, electrode, and measuring the voltage produced by said electrode pair as a measurement of the dissolved oxygen concentration, said liquid being devoid of thallium ions except those originating from the thallium electrode.

References Cited by the Examiner

UNITED STATES PATENTS

| | | | |
|---|---|---|---|
| 2,870,078 | 1/1959 | Hood | 204—195 |
| 3,000,805 | 9/1961 | Carritt et al. | 204—195 |

OTHER REFERENCES

Gerke: "Physical Review," volume I, January 1925, pages 377–395.

Gerke: "J. of American Chemical Soc.," volume 44, 1922, pages 1684–1704.

Le Baron et al.: "Transactions of the Electrochemical Society," vol. 79, 1941, pages 155–162.

JOHN H. MACK, *Primary Examiner.*

JOHN R. SPECK, WINSTON A. DOUGLAS, *Examiners.*